United States Patent [19]

Obra

[11] 4,089,228
[45] May 16, 1978

[54] MOTION GENERATING MECHANISM

[75] Inventor: Bart R. Obra, St. Clair Shores, Mich.

[73] Assignee: Easom Engineering & Manufacturing Corporation, St. Clair Shores, Mich.

[21] Appl. No.: 584,761

[22] Filed: Jun. 9, 1975

[51] Int. Cl.$^2$ ............................................. F16H 37/12
[52] U.S. Cl. .................................... 74/52; 74/781 R; 74/394
[58] Field of Search ...................... 74/52, 781 R, 394

[56] References Cited

U.S. PATENT DOCUMENTS

| | | | |
|---|---|---|---|
| 2,119,431 | 5/1938 | Gommel | 74/781 R X |
| 2,250,584 | 7/1941 | Kreuger et al. | 74/52 |
| 2,398,236 | 4/1946 | Lundquist | 74/781 R |
| 2,402,382 | 6/1946 | Dodge | 74/781 R |
| 2,465,201 | 3/1949 | Coombes | 74/781 R |
| 2,515,616 | 7/1950 | Thomas | 74/52 |
| 2,695,522 | 11/1954 | Papworth | 74/52 |
| 3,529,485 | 9/1970 | Kofferlein | 74/394 |

Primary Examiner—Samuel Scott
Assistant Examiner—Wesley S. Ratliff, Jr.
Attorney, Agent, or Firm—Basile and Weintraub

[57] ABSTRACT

A combined epicycloidal and harmonic motion generating mechanism which comprises a support frame mounting a prime mover coupled through a gear reducer to drive a primary rotary member about a fixed first axis on which a sun gear is concentrically disposed. The primary rotary member carries one or more roller gears that are engaged by the sun gear such that the roller gears rotate about a second axis which is parallel to the fixed first axis and movable with respect to said first axis as the primary rotary gear is driven by the electric motor. Each roller gear has an upper portion on which is mounted a roller adapted to movably engage a slotted section formed in a plate member adapted to be driven by the roller for rotation about the aforementioned fixed first axis such that the motion of a selected point on the plate varies in a combined epicycloidal and harmonic manner relative to the velocity of the primary rotary member.

The mechanism is disclosed as an integral part of two types of linear transfer machines and a rotating crank mechanism all of which are adapted to have an output that is a function of the combined epicycloidal and harmonic motion.

10 Claims, 23 Drawing Figures

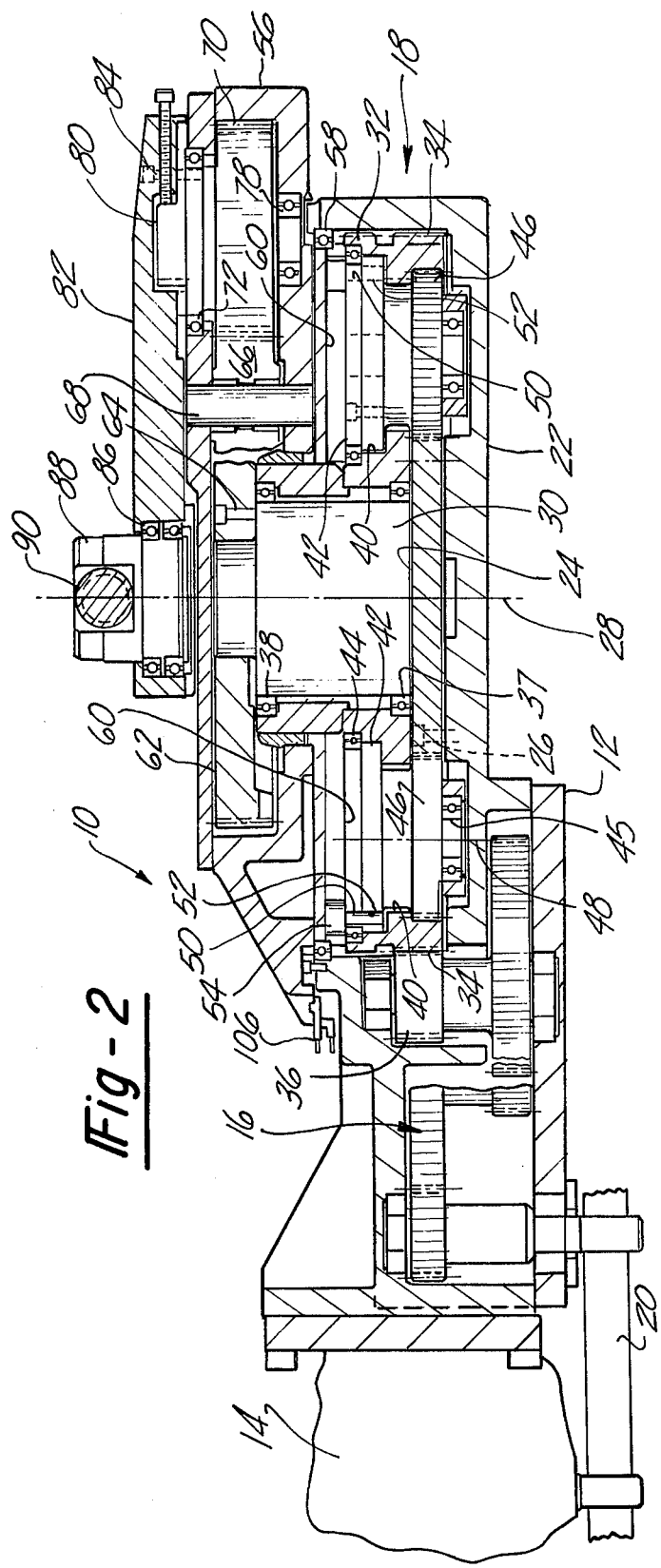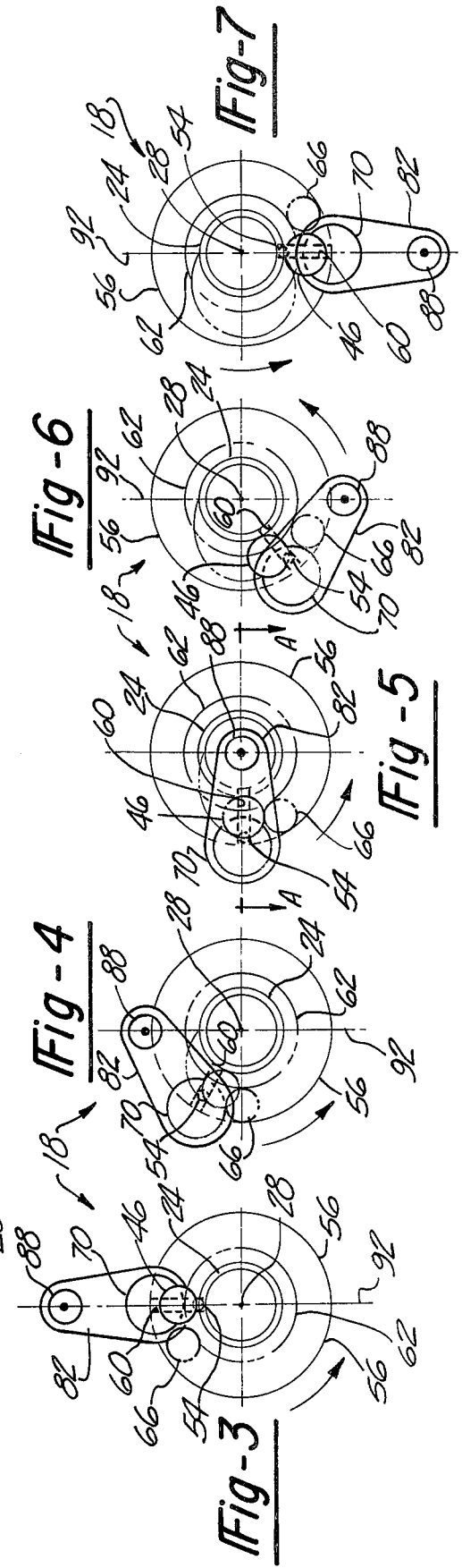

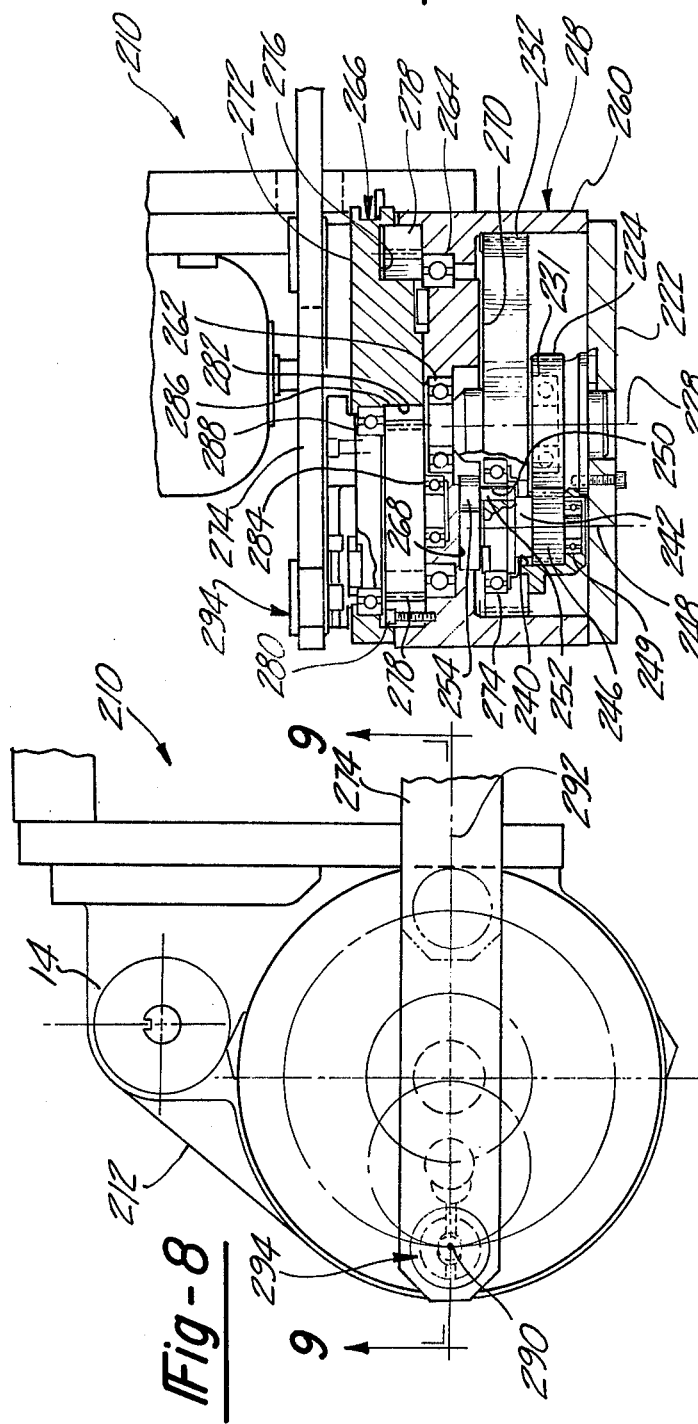

MOTION GENERATING MECHANISM

BACKGROUND OF THE INVENTION

I. Field of the Invention

The present invention relates to cyclically repetitive motion generating systems and, in particular, to a mechanism which will generate an output that has a combined epicycloidal and harmonic motion.

II. Description of the Prior Art

Heretofore numerous apparatuses and devices have been utilized to provide a desired motion of an output member along a prescribed path such as the linear indexing mechanism disclosed in U.S. Pat. No. 3,857,292 which is designed to achieve cycloidal motion of an output member along a linear path. Other mechanisms disclosed in the prior art generally achieve cyclically repetitive motion by utilizing complicated cam grooves and followers to accomplish predetermined acceleration, deceleration, dwell, and reversing characteristics of the output member.

To the knowledge of the inventor, such machines and, in particular, the type disclosed in the aforementioned patent have very little flexibility in varying from the cycloidal acceleration curve so as to either increase or decrease the dwell and peak speeds of the output member. Since the dwell periods for such systems have short dwell periods due to the nature of the cycloidal output motion, the electric motor driving such a mechanical mechanism has less revolutions in which to start and stop. Consequently, electrical switches and the like which must be activated by the output member of such mechanisms are activated at a higher speed (i.e. 100 rpm) by a rotating crank member; and, thus, the life expectancy of such switching mechanisms associated with the prior art mechanical devices are considerably shortened.

Because of the size of mechanical devices presently available having cycloidal output motions, the machines must be positioned at the end of a transfer line which, in turn, may be a considerable length, such as 75 to 100 feet long. As such transfer lines are placed into motion, changes in temperature may cause a sufficient change in the length of the transfer bar as to result in the inaccurate positioning of the parts being moved thereon.

In the prior art systems it has also been necessary to utilize a worm gear drive between the prime mover and the cycloidal indexing mechanism; the elimination of such a worm gear drive would result in a more efficient system.

Additionally, the prior art transfer mechanisms of the cycloidal type require that the prime mover (generally an electric motor) be reversed in order to obtain a forward and return movement of the transfer mechanism. It would be desirable to provide a mechanism which does not require the reversal of the electric motor in order to change the direction of movement of the output member.

SUMMARY OF THE INVENTION

The present invention which will be described subsequently in greater detail comprises a mechanism for achieving a combined epicycloidal and harmonic output motion of an output member along a predetermined path. The mechanism comprises a support frame that carries a primary gear mounted for rotation about a fixed first axis and a prime mover which engages and drives the primary gear. The primary gear carries a secondary gear which is adapted for rotation about a second axis that is both parallel and movable with respect to the fixed first axis. Motion imparting means are provided for engaging the secondary gear to rotate the same about the second axis as the primary gear is rotated. A rotary member carried by the support frame is coupled to the secondary gear by means of a coupling member which rotates the rotary member in such a manner that an output member attached thereto will move along a prescribed path and have a combined epicycloidal and harmonic motion.

It is therefore an object of the present invention to provide a mechanism which, with a simple constant velocity input, will produce a combined epicycloidal and harmonic output motion.

It is a further object of the present invention to provide a mechanism having an output motion which can approximate a cycloidal acceleration curve, but which may be varied to either increase the dwell and the peak speed or decrease the dwell and the peak speed.

It is a further object of the present invention to provide a mechanism which is relatively simple in construction, compact in size, and which operates in an enclosed environment.

It is still a further object of the present invention to provide a mechanism of the type described herein which may be used as the motive force in a transfer system and which can provide, as desired, a linear or angular output motion wherein the prime mover need operate only in one direction to provide both a forward and return motion resulting in a reduction in wear of components of the system, including the gear train and electrical components associated with such transfer systems.

Other objects, advantages and applications of the present invention will become apparent to those skilled in the art of motion generating mechanisms of the type disclosed herein when the accompanying description of several examples of the best modes contemplated for practicing the invention are read in conjunction with the accompanying drawings.

BRIEF DESCRIPTION OF THE DRAWINGS

The description herein makes reference to the accompanying drawings wherein like reference numerals refer to like and similar parts throughout the several views and, in which:

FIG. 2 is a fragmentary cross-sectional view of the linear indexing mechanism taken along Line 2—2 of FIG. 1;

FIGS. 3–7, inclusive, are a series of diagrammatic views illustrating the parts of the linear indexing mechanism illustrated in FIGS. 1 and 2 in sequential positions through one cycle of operation of the mechanism;

FIG. 8 is a top plan view of a second embodiment of the present invention in the form of a linear indexing mechanism constructed in accordance with the principles of the present invention;

FIG. 9 is a fragmentary cross-sectional view of the linear indexing mechanism taken along Line 9—9 of FIG. 8;

FIGS. 10–14, inclusive, are a series of diagrammatic views illustrating the components of the linear indexing mechanism illustrated in FIGS. 8 and 9 with the components thereof being shown in sequential positions through one cycle of operation of the mechanism;

DESCRIPTION OF THE PREFERRED EMBODIMENTS

Figure 1:
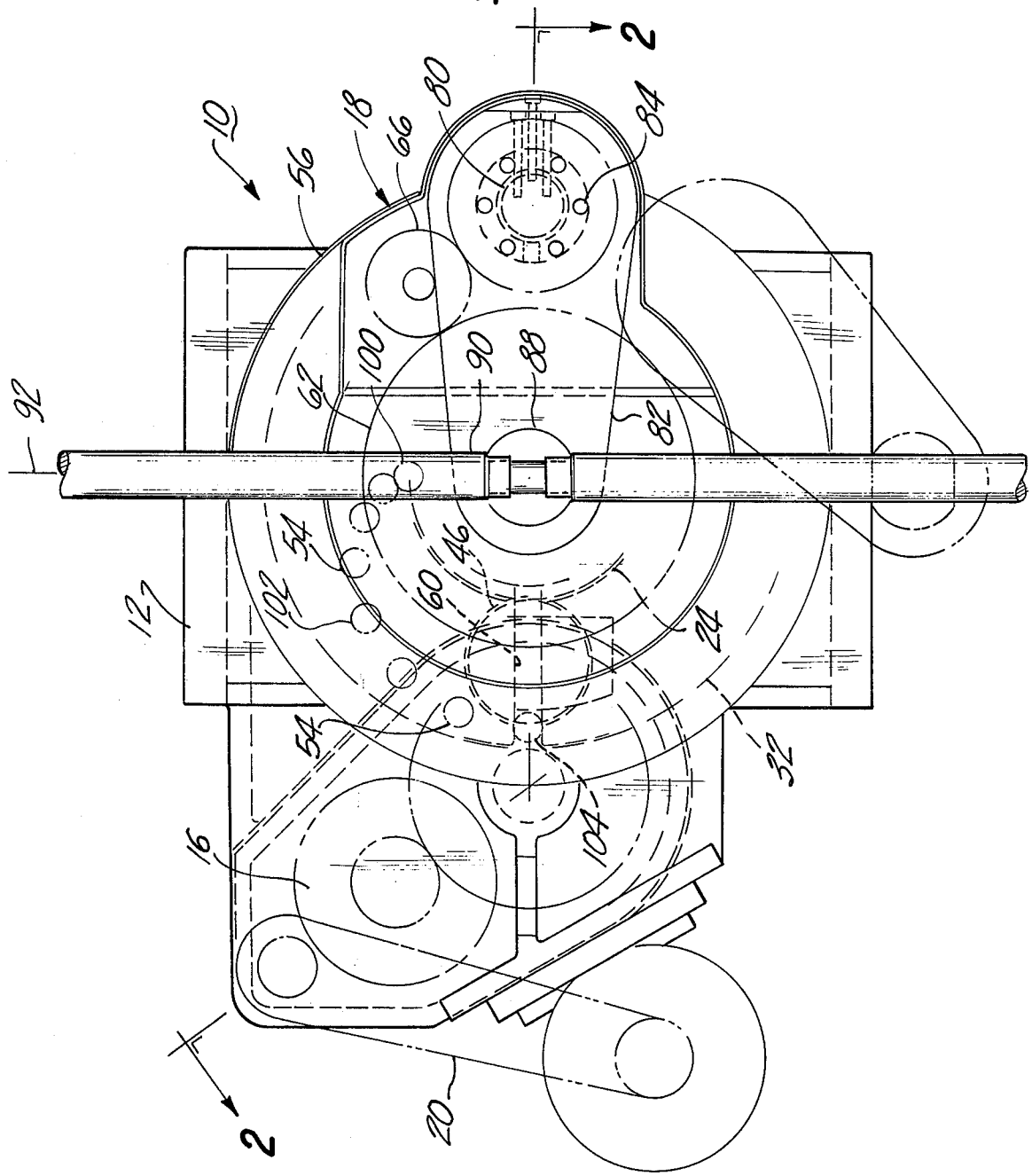
FIG. 1 is a top plan view of a linear indexing mechanism constructed in accordance with the principles of the present invention.

Referring now to the drawings and, in particular, to FIGS. 1 and 2 wherein there is illustrated one example of the present invention in the form of a linear indexing mechanism 10 comprising a base 12 that supports a prime mover 14, a gear reducer 16, and a combined epicycloidal and harmonic motion generating mechanism 18. The prime mover 14 may be an electric motor which drives the gear reducer 16 through a suitable pulley and belt arrangement 20.

The motion generating mechanism 18 comprises a support frame 22 which mounts a fixed sun gear 24 by any suitable means such as bolt 26 extending through the sun gear 24 into threaded engagement with the support frame 22. The non-rotating sun gear 24 is concentric about a fixed first axis 28. A stationary support shaft 30 is supported by the upper surface of the sun gear 24 and is similarly concentric with the fixed axis 28. The mechanism 18 further comprises a primary rotary member 32 having an outer gear 34 formed on the outer surface thereof and which is drivingly engaged by the drive gear 36 of the gear reducer 16. The primary rotating member 32 is supported concentrically about the fixed axis 28 for rotation thereabout by means of bearings 37 and 38 which are carried by the support shaft 30. It can thus be seen that when the gear reducer drive gear 36 rotates to drive the outer gear 34, the primary rotating member 32 will rotate about the fixed axis 28 concentric with the sun gear 24.

The primary rotating member 32 is provided with a plurality of arcuately spaced apertures 40 which rotatably support secondary rotary members 42 by means of an upper bearing 44 and a lower bearing 45, both of which are carried by the primary rotating member 32. Hereinafter only one of the secondary rotary members 42 will be described as the remaining members are identical thereto; and, thus, a reference to one should be sufficient for an understanding of the remaining rotary members 42. It should also be understood that while only two of the rotary members 42 are disclosed in FIG. 2, the present invention may be constructed with one or more such rotary members 42 depending upon the size of the load to be indexed by the mechanism. As can best be seen in FIG. 2, the secondary rotary member 42 has a lower portion on which is formed a roller or planetary gear 46 that is adapted to mesh with the non-rotating sun gear 24; and, thus, it can be seen that as the drive gear 36 rotates the primary rotating member 32 about the fixed axis 28, the engagement of the roller gear 46 with the sun gear 24 will result in the rotation of the secondary rotary member 42 about an axis 48. The gear 46 is concentric about axis 48 which, in turn, is parallel to the fixed axis 28 but angularly movable with respect to the fixed axis 28 as the primary rotating member 32 rotates. It should be noted that a 2:1 ratio is maintained between the non-rotating sun gear 24 and the planetary or roller gear 46.

As can best be seen in FIG. 2, the upper portion of the secondary rotary member 42 is provided with a vertical aperture 50 within which is disposed a support pin 52, the upper end of which rotatably supports a drive roller 54. As can also be seen in FIG. 2, the drive roller 54 is disposed on the pitch line of the roller gear 46. During the initial operation of the mechanism 18 when the drive roller 54 is in line with the pitch line of the roller gear 46 on the side thereof closest to the axis 28 (as shown diagrammatically in FIG. 3), the mechanism 18 will be at a dwell position. As the primary rotating member 32 rotates and thereby rotates the secondary member 42 to move the roller 54 along the path illustrated in phantom lines in FIG. 1, the roller 54 will move to a position at a point farthest away from the axis 28 at which time a maximum angular velocity will have been reached (FIG. 5). While the motion and operation of the mechanism 18 will be described in greater detail hereinafter, it should also be noted that by changing the relationship of the drive roller 54 with respect to the roller gear 46, that is, by repositioning the drive roller 54 at locations toward the center axis 48 of the roller gear 46 (at positions away from the pitch line of the roller gear 46), the maximum velocity and dwell period will decrease. If the drive roller 54 is moved radially outward from the axis 48, that is, beyond the pitch line of the roller gear 46, the maximum velocity and dwell period would increase. There would also be a very slight reverse displacement in the output motion of the mechanism which would occur at the dwell point and which will be described hereinafter in greater detail.

Still referring to FIG. 2, the mechanism 18 further comprises a crank plate member 56 which is supported on a bearing 58 for rotational movement about the axis 28. The bottom side of the crank plate member 56 is provided with a plurality of radially disposed slots 60 which movably receive the drive rollers 54. It can thus be seen that as the primary rotating member 32 is rotated so as to cause a rotational movement of the secondary rotating members 42 about the axis 48, the movable engagement of the drive rollers 54 and the slots 60 will rotate the crank plate member 56 about the axis 28 with an epicycloidal-harmonic motion having an acceleration-velocity characterisitc as will be described hereinafter.

Still referring to FIG. 2, it can be seen that the upper end of the support shaft 30 supports a stationary gear 62 which is attached to the support shaft 30 by any suitable means such as bolt 64 extending through the gear 62 and into threaded engagement with the support shaft 30. Referring now to both FIGS. 1 and 2, it can be seen that the stationary gear 62 is adapted to mesh with an idler gear 66 that is carried on a shaft 68 which, in turn, is supported at its opposite ends by the crank plate member 56. Thus, as the crank plate member 56 rotates, the engagement of the idler gear 66 with the stationary gear 62 will result in the rotation of the idler gear 66. The crank plate member 56 further supports a crank gear 70 by means of bearings 72 and 78 respectively disposed above and below the crank gear 70 and within appropriate recesses in the crank plate member 56. The crank gear 70 meshes with the idler gear 66 and is driven thereby when the idler gear 66 is rotated under the combined action of the plate member 56 and the stationary gear 62. An upwardly disposed shaft 80 carried by and rotatable with the crank gear 70 is coupled to a crank arm 82 by any suitable means such as bolts 84 extending through the crank arm 82 and into threaded engagement with the support shaft 80. The crank arm 82 extends radially toward the center of the mechanism 18 for connection by means of a suitable bearing 86 and a flexible coupling 88 to an indexing shaft 90 of a transfer machine, the connection being made in line with the axis 28. It is a purpose of the aforementioned mechanism to move the indexing shaft 90 from a start position, illustrated in FIG. 3, to an extended position, illustrated in FIG. 7, and then return the indexing shaft 90 back to the initial start position, illustrated in FIG. 3. This is accomplished while maintaining the point of connection between the crank arm 82 and the indexing shaft 90 along the longitudinal axis 92 of the indexing shaft 90, such axis 92 being more clearly shown in FIG. 1. At the same time it is desired to provide an output motion for the indexing shaft 90 which corresponds to the acceleration-velocity characteristics of the combined epicycloidal and harmonic motion to be described hereinafter.

Referring momentarily to FIG. 1, the positions of the drive roller 54 are illustrated in phantom lines at 100-104. At the position 100 the drive roller 54 corresponds to the position illustrated in FIG. 3, that is, at the start of the cycle wherein the indexing shaft 90 is fully extended in one direction; this is a dwell position. The position 102 in FIG. 1 corresponds to the position of the crank arm 82 in an intermediate position (FIG. 4) between the dwell point at 100 and the maximum velocity position 104. The position 104 corresponds to the diagrammatical illustration shown in FIG. 5 and represents the mid-stroke of the indexing shaft 90. It should also be noted that FIG. 5 is a representation of the mechanism as if FIG. 2 were a cross-sectional view taken through Line A—A of FIG. 5.

FIG. 6 illustrates the position of the crank arm 82 during the deceleration phase of the crank arm 82, while FIG. 7 diagrammatically illustrates the fully extended position of the crank arm 82 at the maximum transfer distance when the drive roller 54 is positioned closest to the fixed axis 28. In FIG. 7 the crank arm 82 is at a second dwell position. It should be noted that at this point the motor 14 may be reversed and the cycle reversed to move the crank arm 82 to the initial start position, illustrated in FIG. 3. Alternately, and preferably, the electric motor 14 continues to operate in the same direction with the crank arm 82 rotating counterclockwise to the initial start position.

The embodiment illustrated in FIGS. 1 and 2 of the drawings offers considerable advantages over the prior art structures in that longer dwell periods are obtainable with the epicycloidal-harmonic index mechanism and, as such, the electric motor 14 is permitted to have more load-free revolutions in which to start and has more revolutions in which to stop. Additionally, the electrical switches needed to operate the system and actuated by dogs 106 can be positioned to be tripped at a lower velocity when the crank arm 82 is in a decelerating stage; thus a longer life expectancy of the switch arms and the mechanism associated therewith can be expected.

Because of the compact size of the epicycloidal-harmonic index mechanism 10, it is more suited for a location in the center of a transfer line with ample space below the mechanism to permit the movement of a machine chip conveyer without any interference. The positioning of the mechanism 10 at the center of the transfer line eliminates the aforementioned problems and difficulties associated with the expansion of the transfer bar during operation.

It should also be noted that since the mechanism may be completely enclosed, there are not difficulties with falling chips or cooling problems. Additionally, since the mechanism may be totally enclosed, the various gears may be grease packed, thus, eliminating special lubrication problems. It can also be seen that because of the simple construction of the apparatus, it may be easily manufactured and the mechanism may be easily adjusted for index stroke length. Additionally, because of the large diameter of the primary rotating member 32 and the outer gear 34, the required reduction is more readily obtained through spur gears rather than the more expensive and less efficient worm reduction.

As aforementioned, there is no need to reverse the electric motor 14 in order to have the indexing shaft 90 reciprocated back and forth as the mechanism 18 is designed to rotate the full 360°. This will distribute wear more evenly on the gear teeth as well as save expense in the manufacture of the mechanism as the need for electrical components to reverse the motor is eliminated. However, if the situation warrants, the mechanism 10 is adapted for reversing.

Figure 15:
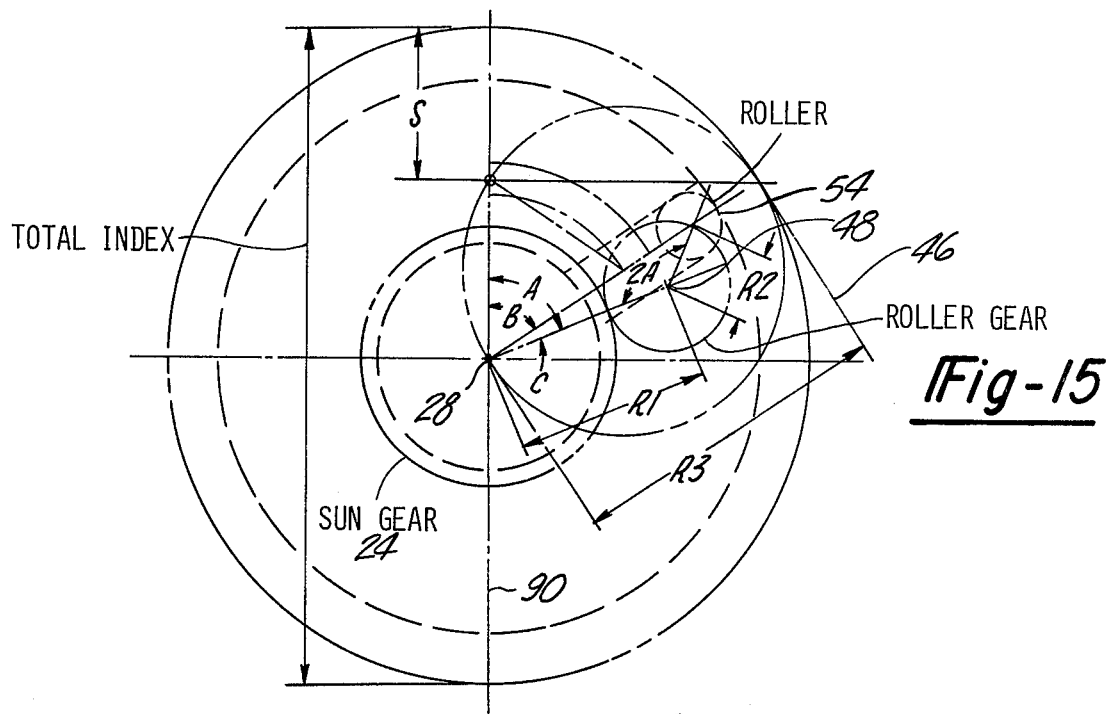
FIG. 15 is a diagrammatical presentation of the inventive portion of the mechanism illustrated throughout the several views showing the basis for the mathematical analyses of the system.

Referring now to FIG. 15, wherein there is illustrated a diagrammatical presentation of the mechanism. By dividing the 180° angular travel of the constant velocity primary rotating member 32 into reasonably small equal angular and time increments and solving for the incremental displacement "S" for each such increment of movement, the linear displacement for each such increment of movement of the indexing shaft 90 along the longitudinal axis 92 may be obtained. The average linear velocity for each such increment is then obtained by dividing the incremental linear displacement by the incremental time period. The maximum velocity is found to be equal to 1½ (R3 W sin A) wherein W represents the angular displacement index time in radians per second. It can thus be seen that the maximum velocity of the combined epicycloidal-harmonic motion is 1½ times that of the harmonic motion when the center of the drive roller 54 is on the pitch diameter of the roller gear 46. In FIG. 15 the various designations therein have the following meaning:

R1 represents the distance from the center of the roller gear axis 48 to the axis 28.

R2 represents one-half the pitch diameter of the roller gear 46.

R3 is the length of the crank arm 82 (this would equal one-half the total displacement of the indexing shaft 90).

S is the incremental movement or displacement of the indexing shaft 90 along the longitudinal axis 92, as aforementioned.

A represents the angular rotational movement of the primary rotating member 32.

2A represents the angular rotational movement of the roller gear 46.

B represents the angular rotational movement of the crank arm 82.

The angle C is found by means of the following equation: Tan C = R2 (sin 2A) / R1 − [R2 (cos 2A)];

Since A, the angular rotational movement of the primary rotating member 32, can be easily determined by measurement, the angle B may be simply found by means of the following formula:

$$B = A - C$$

Once the angle B has been determined, the incremental displacement "S" may be found by the following formula:

$$S = R3 - R3 (\cos B)$$

Having found an incremental displacement "S" of the indexing shaft 90, the velocity at that point may be found as aforementioned, that is, by dividing the incremental linear displacement "S" by the incremental time period.

Figure 16:
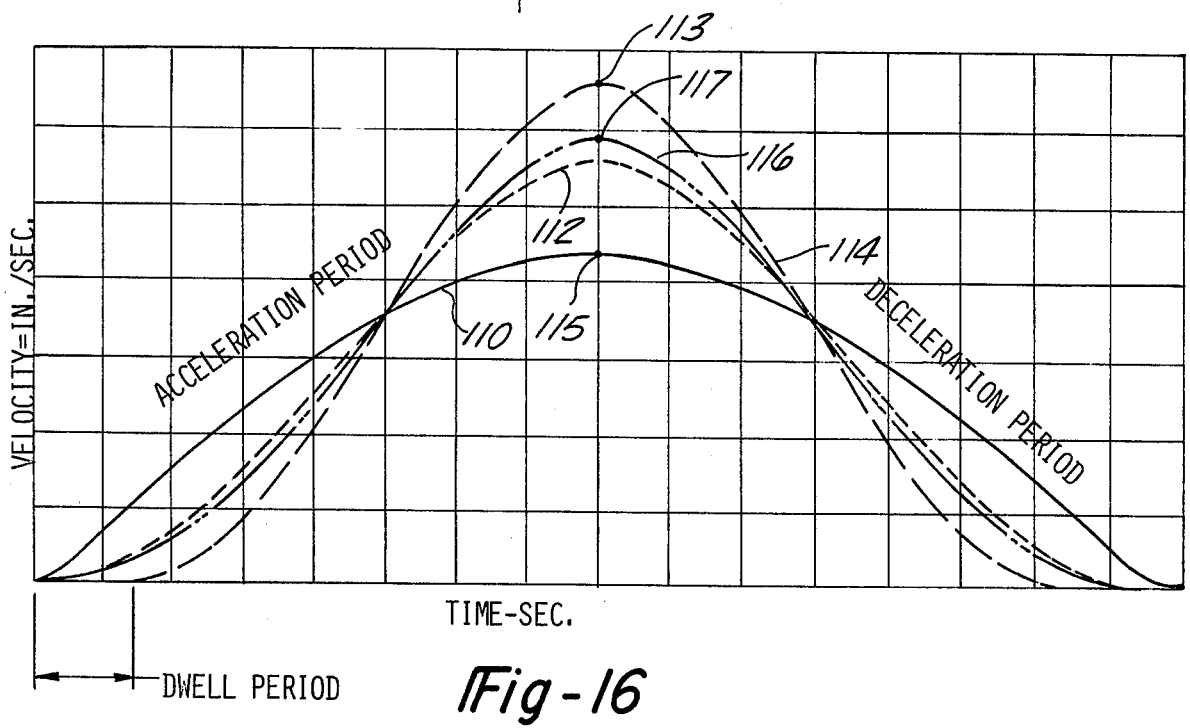
FIG. 16 illustrates in graph form the harmonic, cycloidal, and combined epicycloidal and harmonic velocity versus time characteristics of an output member moving along a prescribed path.

Referring now to FIG. 16, there is illustrated a velocity vs. time graph illustrating the harmonic motion on curve 110, the cycloidal motion on curve 112, and the combined epicycloidal-harmonic motion on curve 114. It can be seen that while the rate of acceleration of the harmonic curve 110 is much greater initially than either the cycloidal or combined epicycloidal-harmonic curves 112 and 114, the maximum velocity obtained by the cycloidal curve 112 and the combined epicycloidal-harmonic curve 114 are greater with the maximum or peak velocity 113 for the combined epicycloidal-harmonic curve 114 being 1½ times the peak velocity 115 of the harmonic motion when the ratio of 2:1 is maintained between the sun gear 24 and the roller gear 46, as aforementioned.

In comparing the combined curve 114 with the cycloidal curve 112, it will be noted that an output member following the combined curve 114 has a more gradual start-up time, and in the middle area of the curve 114 the output member will start accelerating faster than the cycloidal motion and will peak out at a higher speed than the cycloidal motion. As aforementioned the combined epicycloidal-harmonic curve 114, that is, the motion obtainable by applicant's invention, may be easily modified by changing the position of the drive roller 54 with respect to the axis 48 of the roller gear 46. If the center of the drive roller 54 is moved in closer to the axis 48, the rate of acceleration and peak speed at 117 will decrease and a shorter dwell period will be obtained as shown on the modified epicycloidal-harmonic curve 116 in FIG. 16. If the center of the drive roller 54 is positioned at the axis 48, that is, at the center of the roller gear 46, there will be in effect a straight coupling between the gear 46 and the crank plate member 56, and a harmonic motion will be obtained as shown by the curve 110. If, on the other hand, the drive roller 54 should be moved out beyond the pitch diameter of the roller gear 46, there will be an incremental reverse motion at the start of the cycle, and, in effect, the crank arm 82 would back up slightly then go forward. This would in effect lengthen the dwell period while also increasing the rate of acceleration and peak speed.

It can thus be seen that the present inventive mechanism provides a great variety of rates of accelerations which are not obtainable in any of the aforementioned prior art apparatuses known to the inventor. The present invention provides a simple means for obtaining a full range of rates of acceleration and dwell periods from that obtained by harmonic to that obtained through applicant's combined epicycloidal-harmonic motion.

Referring now to FIGS. 8 and 9, wherein there is illustrated a second embodiment of the present invention in the form of a linear indexing mechanism 210 comprising a base 212 that supports a prime mover such as an electric motor 14, a gear reducer (not shown), and a combined epicycloidal and harmonic motion generating mechanism 218. The electric motor 14 is connected through a suitable gear reducer and pulley arrangement in the same manner as aforementioned with respect to the gear reducer 16 and pulley arrangement 20. The motion generating mechanism 218 comprises a support frame 222 which mounts a fixed sun gear 224 by any suitable means, and the sun gear 224 is concentric about an axis 228. The sun gear 224 has a lower set of bearings 231 which in conjunction with upper bearings 262 rotatably support a primary rotary member 232 which is rotated about the axis 228 by means of a driving connection with the electric motor 14 such that the electric motor 14 rotates the primary rotary member 232 at a constant velocity. The primary rotary member 232 is provided with a plurality of arcuately spaced apertures 240 which rotatably support secondary rotary members 242. It should be understood that while only one of the secondary members 242 is illustrated in FIG. 9, the apparatus may be fabricated with one or more such secondary members depending upon the load necessary to be indexed by the mechanism 210. The secondary member 242 is rotatably supported for rotation about an axis 248 respectively by means of upper and lower bearing means 247 and 249. The secondary rotary member 242 has a lower portion on which is formed a roller gear 246 that meshes with the sun gear 224; thus, as the primary rotary member 232 is rotated about the axis 228, the secondary rotary member 242 will rotate about its axis 248. The axis 248 is concentric with the roller gear 246 and parallel to the axis 228 but angularly movable around the axis 228. In a manner similar to the motion generating mechanism 18 described hereinbefore with respect to FIGS. 1 and 2, the ratio of 2:1 is maintained between the non-rotating sun gear 224 and the roller gear 246. The upper portion of the secondary rotary member 242 is provided with a vertical aperture 250 within which is disposed a support pin 252, the upper end of which rotatably supports a drive roller 254. The drive roller 254 is disposed on the pitch line of the roller gear 246. During the initial operation of the mechanism 218 when the roller 254 is in line with the pitch line of the roller gear 246 on the side closest to the axis 228 (as shown in FIG. 10), the mechanism 218 is in a dwell position. As the primary rotary member 232 rotates and thereby causes rotation of the secondary member 242, the drive roller 254 will move along the path similar to the drive roller 54 hereinbefore described and as shown schematically in FIGS. 10-13 wherein the roller 254 is shown in FIG. 10 at the start position of the linear cycle. In FIG. 11 the drive roller 254 is illustrated at an intermediate position, while in FIG. 12 it is shown at a maximum velocity position midway through the stroke of the indexing mechanism. FIG. 13 illustrates the drive roller 254 at an intermediate decelerating position, while the drive roller 254 in FIG. 14 is shown at a dwell position at the end of the stroke of the indexing mechanism. In a manner similar to the mechanism 10 the motion and operation of the mechanism 210 can also be changed by changing the relationship between the drive roller 254 with respect to the roller gear 246, and the same results as hereinbefore described with respect to the mechanism 10 and the relationship described with respect to the graph illustrated in FIG. 16 will be obtained. That is, a repositioning of the drive roller 254 at a location toward the center axis 248 of the roller gear 246 (at a position away from the pitch line of the roller gear 246) results in the rate of acceleration, peak speed and dwell period being decreased.

The side walls 260 of the mechanism 210 mount bearing 264 which is provided for the purpose of rotatably supporting a plate member 266 which is adapted for rotational movement about the axis 228. The plate member 266 is provided with a plurality of radial slots 268 on the underside thereof which are slidably and movably engaged by the drive member 254 such that, as the primary rotary member 232 is rotated about the axis 228 to cause the rotational movement of the secondary rotating members 242 about their own axes 248, the engagement of the drive roller 254 with the slots 268 will cause the plate 266 to rotate about the axis 228 in a manner substantially the same as that described with respect to the embodiment illustrated in FIGS. 1 and 2 of the drawings. The plate member 266 is quite large, having a lower surface 270 immediately above the primary rotary member 232 and an upper surface 272 immediately below an indexing bar 274 which in FIG. 9 is illustrated in its retracted or minimum stroke position, the same being a dwell point in the cycle of movement of the indexing bar 274.

The plate member 266 has an angular slot 276 within which is disposed in a spaced relationship a ring gear 278 which, in turn, is fastened to the side walls 260 by any suitable means such as bolts 280 extending through the ring gear 278 into a threaded engagement with the side walls 260. It can thus be seen that the ring gear 278 is stationary with respect to the rotating plate member 266. As can best be seen in FIG. 9, the plate member 266 has a step bore 282, the bottom of which is provided with a bearing 284 within which is seated the lower portion of a planetary or crank gear 286 while the upper portion of the planetary gear 286 is rotatably supported by bearings 288. The bearings 288 are also carried in the step bore 282 of the plate member 266. The planetary or crank gear 286 is so situated as to mesh with the ring gear 278; thus as the plate member 266 is rotated about the axis 228, the planetary gear 286 will rotate inside the ring gear 278, there being a point 290 (FIGS. 10-14) which will follow the longitudinal or straight line path of axis 292 on which the indexing bar 274 is reciprocated. It is at this point that the planetary gear 286 is coupled to the indexing bar 274 by any suitable coupling means such as designated by the numeral 294.

As can best be seen in FIG. 10, the mechanism 210 is illustrated in a schematic form with the outer circle representing the pitch diameter of the ring gear 278, while the inner solid circle represents the pitch diameter of the lower fixed sun gear 224 which engages the roller gear 246. The plate 266 is illustrated in dotted lines as is the slot 268 therein, and which is slidably engaged by the drive roller 254. The drive roller 254 is carried by the roller gear 246 at the pitch line of the gear 246, and in FIG. 10 the mechanism is illustrated in a start-up position with the roller 254 and the mechanism 218 being in a dwell position. The mechanism 218 is shown in a partially accelerated position in FIG. 11, while in FIG. 12 the drive roller 254 is located farthest out from the axis 228 and at a maximum velocity. It should be noted that the point 290 on the planetary gear 286 is following a straight line path which is the path along which the indexing bar 274 is desired to be reciprocated. In FIG. 13 the mechanism is illustrated schematically in a decelerating mode, while in FIG. 14 the mechanism is in a dwell position with the indexing bar 274 being fully extended. The reversal of the bar 274, that is, the return of the bar 274 to its initial position, may be obtained by a continued clockwise rotation of the mechanism, or the motor 14 may be electrically reversed and the system rotated in a counterclockwise direction as desired.

The description of the mechanism 10 and its relationship to the mathematical explanation as set forth with respect to FIG. 15 and the velocity-time curves illustrated in FIG. 16 are equally applicable to the mechanism 210 and, thus, need not be repeated.

Figure 17:
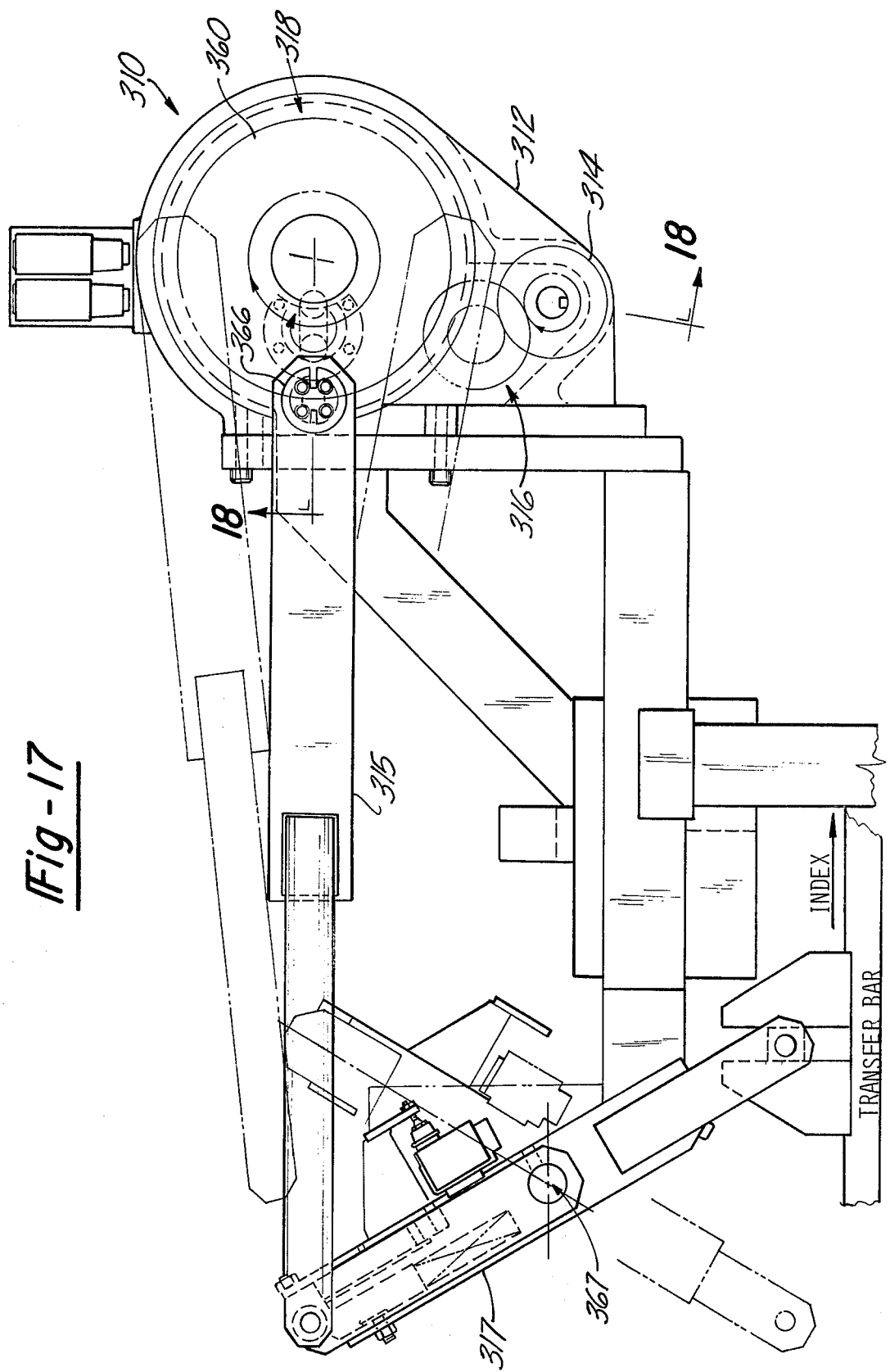
FIG. 17 is a side elevational view of a third embodiment of the present invention illustrating the use of the inventive mechanism in conjunction with an overhead linear transfer machine.
Figures 18, 19, 20, 21, 22, 23:
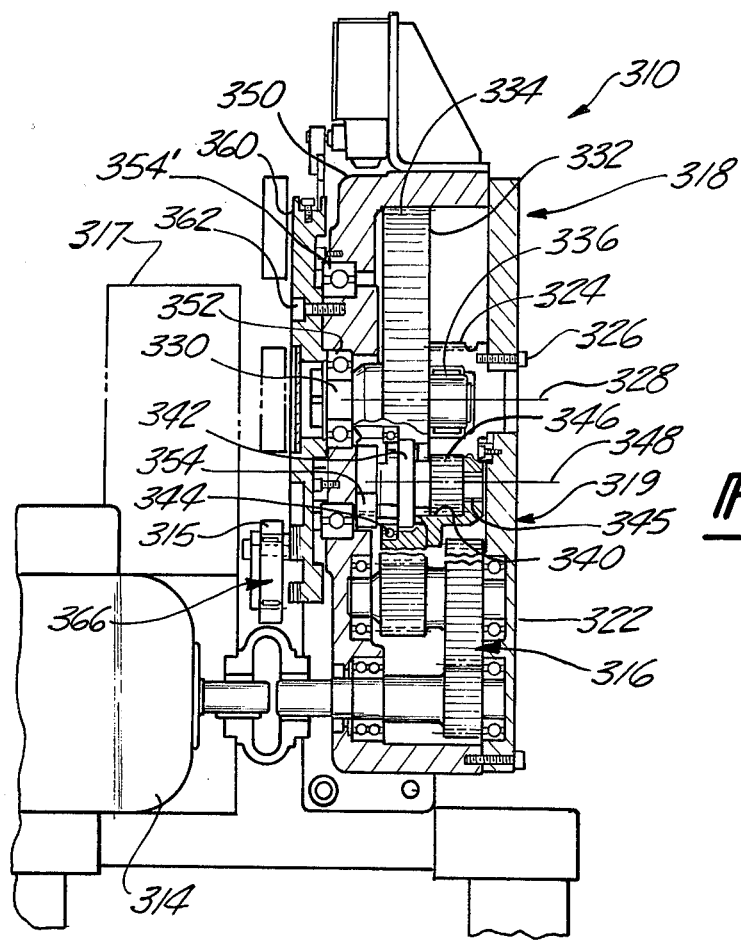
FIG. 18 is a fragmentary cross-sectional view of the mechanism taken along Line 18—18 of FIG. 17.
FIGS. 19-23 are a series of diagrammatic views illustrating the parts of the mechanism illustrated in FIGS. 17 and 18 in sequential positions through a cycle of operation of the mechanism.

Referring now to FIGS. 17 and 18 of the drawings, wherein there is illustrated a third example of the present invention in the form of a crank-type mechanism 310 which comprises a base 312 that supports a prime mover in the form of an electric motor 314, a gear reducer 316, and a combined epicycloidal and harmonic motion generating mechanism 318 which is connected to an output link 315 (FIG. 17) which, in turn, is connected to a lever arm 317. In the present example the link 315 is moved back and forth in a cranking-type motion; however it should be understood that the present example is just one application of many applications in which the mechanism 310 may be employed; for example, it may be used to rotate a trunnion or turn parts over, as desired. This embodiment of the present invention can also be used for indexing trunniontype machines having the trunnion shaft at a pivot 367 and using some suitable disconnecting means to reset the lever arm 317 for the next index. The same embodiment may be used to tip or angularly rotate components having a pivot point at 367.

The manner in which the link 315 is actuated so as to obtain the aforementioned combined epicycloidal-harmonic motion will be explained herein in greater detail; however, it should be pointed out that the remarks with respect to the mathematical analysis described with respect to FIG. 15 and the discussion of the graphs illustrated in FIG. 16 are applicable to the following description of the mechanism 310.

As can best be seen in FIG. 18, the mechanism 310 comprises a housing 319 having a base portion 322 that fixedly supports a sun gear 324 by any suitable means such as bolt 326 extending through the base portion 322 and into threaded engagement with the sun gear 324. The non-rotating sun gear 324 is concentric about a fixed first axis 328. The mechanism 318 further comprises a primary rotary member 332 having an outer gear 334 formed on the outer surface thereof which is drivingly engaged by the gears in the gear reducer 316 such that the primary rotary member 332 may be rotated about the axis 328. The primary rotating member 332 is supported concentrically about the axis 328 by means of a bearing 336 carried by the fixed gear 324 and bearing 352 carried by a drive plate 350.

The primary rotating member 332 is provided with a plurality of arcuately-spaced apertures 340 (only one of which is shown). The apertures 340 rotatably support secondary rotary members 342 by means of left and right end bearings 344 and 345 (as viewed in FIG. 18).

The secondary rotary member 342 has an end portion on which is formed a roller gear 346 adapted to mesh with the non-rotating sun gear 324. Thus, it can be seen that as the primary rotating member 332 is rotated about the axis 328, the engagement of the roller gear 346 with the sun gear 324 will result in the rotation of the secondary rotary member 342 about its own axis 348 which axis is parallel to the axis 328 and is angularly movable with respect to the axis 328. It should be noted that the aforementioned 2:1 ratio is maintained between a nonrotating sun gear 324 and the roller gear 346.

The other end portion of the secondary rotary member 342 is provided with an aperture within which is disposed a support pin, the outer end of which rotatably supports a drive roller 354 which, in turn, is disposed on the pitch line of the roller gear 346, and the mechanisn as thus described is substantially identical to the mechanism 18 described hereinbefore with respect to FIGS. 1 and 2; thus, a further detailed description of the manner and mode of operation of this aspect of the inventive concept need not be had.

The mechanism 318 further comprises a drive plate 350 which is rotatably supported by means of a bearing 354' in the side walls of the housing 319. The bearing 352, as aforementioned, is carried in the drive plate 350 to support shaft 330 of the primary member 332. The inner surface of the drive plate 350 has a plurality of radial slots 356 which are movable and slidably engaged by the drive rollers 354 to rotate the drive plate 350 about the axis 328 in the same manner as described with respect to the aforementioned apparatuses 18 and 218. A crank plate 360 is attached to the outer surface of the drive plate 350 by any suitable means such as bolts 362 that extend through the crank plate and into threaded engagement with the drive plate 350. As can best be seen in FIG. 17, the crank plate 360 is coupled to the link 315 by a suitable coupling mechanism 366; thus, for the reasons stated hereinbefore, it can be seen that as a constant valocity input is provided to the primary rotary member 332, the output motion of the link 315 will be that of the inventive combined epicycloidal-harmonic motion.

FIGS. 19–23 illustrate the various phases of the cycle of the mechanism illustrated in FIGS. 17 and 18, with FIG. 19 illustrating the start position wherein the link 315 and the coupling 366 are located at the left side of the mid-section of the mechanism as viewed in FIG. 17 in a dwell position. In FIG. 20 the coupling 366 is shown accelerating towards the maximum valocity mid-stroke position illustrated in FIG. 21, while in FIG. 22 the relationship between the elements is illustrated in a decelerating phase. In FIG. 23 the mechanism 318 is shown with the coupling 366 being disposed at the right side of the mid-section of the mechanism as viewed in FIG. 17 and in a dwell position.

It can thus be seen that the present invention has provided a new and improved mechanism which, with a simple constant velocity input, will produce a combined epicycloidal and harmonic output motion along a prescribed path all of which is accomplished in the manner which offers the user a great variety of acceleration characteristics heretofore unattainable with a single design.

It should also be noted that the present invention has provided a mechanism of the type described herein which is relatively simple in construction, compact in size, and which operates in an enclosed and thus safe environment.

It should also be noted that the present invention may be employed to actuate presses and other types of mechanisms which would require the combined epicycloidal and harmonic motion.

It should be understood by those skilled in the art of motion generating machines that other forms of the present invention can be had all coming within the spirit of the present invention and the scope of the appended claims.

What is claimed is as follows:

1. A combined epicycloidal and harmonic motion generating mechanism comprising:
   a support frame;
   a first rotary member carried by said support frame for rotation about a fixed first axis;
   first driving means for driving said first rotary member at a constant velocity;
   a second rotary member carried by said first rotary member and rotatable therewith about said first axis as said second rotating member rotates about a second movable axis that is parallel to said first axis;
   rotation inducing means carried by said support frame and engaging said second rotary member for rotating said second rotary member about said second axis;
   a third rotary member carried by said support frame for rotation about said first axis, said third rotary member being axially spaced from said first and second rotary members, said third rotary member having one side thereof adjacent said second rotary member, said one side having a radial slot;
   a coupling member carried by said second rotary member and disposed along an axis which is spaced from said second axis, said coupling member moving along a uniform circular path as said second rotary member rotates about said second axis, said coupling member movably engaging said third rotary member slot to rotate said third rotary member about said first axis as said second rotary member rotates, the engagement of said coupling member with said slot being such that there is a relative lost motion between said coupling member and said third rotating member during cyclical periods of movement of said coupling member whereby said third member accelerates from or near zero velocity and decelerates to or near zero velocity as said first rotary member rotates at a constant valocity;
   said rotation inducing means being a stationary gear carried by said support frame, said second rotary member having a gear formed thereon and engaging said stationary gear such that said second rotary member rotates about said second movable axis as said first rotary member moves said second rotary member relative to said stationary gear; and said coupling member being disposed along an axis which is spaced from said second axis.

2. The combined epicycloidal and harmonic motion generating mechanism defined in claim 1 wherein the ratio of the pitch diameter of said stationary gear to the pitch diameter of said second rotary member gear is 2:1.

3. A combined epicycloidal and harmonic motion generating mechanism comprising:
   a support frame;
   a first rotary member carried by said support frame for rotation about a fixed first axis;

first driving means for driving said first rotary member at a constant velocity;

a second rotary member carried by said first rotary member and rotatable therewith about said first axis as said second rotating member rotates about a second movable axis that is parallel to said first axis;

rotation inducing means carried by said support frame and engaging said second rotary member for rotating said second rotary member about said second axis;

a third rotary member carried by said support frame for rotation about said first axis, said third rotary member being axially spaced from said first and second rotary members, said third rotary member having one side thereof adjacent said second rotary member, said one side having a radial slot;

a coupling member carried by said second rotary member and spaced from said second axis, said coupling member moving along a uniform circular path as said second rotary member rotates about said second axis, said coupling member movably engaging said third rotary member slot to rotate said third rotary member about said first axis as said second rotary member rotates;

said rotation inducing means being a stationary gear carried by said support frame, said second rotary member having a gear formed thereon and engaging said stationary gear such that said second rotary member rotates about said second movable axis as said first rotary member moves said second rotary member relative to said stationary gear; and said coupling member axis being in line with the pitch line of said second rotary member gear, the engagement of said coupling member with said slot being such that there is a relative lost motion between said coupling member and said third rotating member during cyclical periods of movement of said coupling member whereby said third member accelerates from or near zero velocity and decelerates to or near zero velocity as said first rotary member rotates at a constant velocity.

4. A combined epicycloidal and harmonic motion generating mechanism comprising:

a support frame;

a first rotary member carried by said support frame for rotation about a fixed first axis at a constant velocity;

first driving means for driving said first rotary member;

a second rotary member carried by said first rotary member and rotatable therewith about said first axis as said second rotating member rotates about a second movable axis that is parallel to said first axis;

rotation inducing means carried by said support frame and engaging said second rotary member for rotating said second rotary member about said second axis;

a third rotary member carried by said support frame for rotation about said first axis, said third rotary member being axially spaced from said first and second rotary members, said third rotary member having one side thereof adjacent said second rotary member, said one side having a radial slot;

a coupling member carried by said second rotary member and spaced from said second axis, said coupling member moving along a uniform circular path as said second rotary member rotates about said second axis, said coupling member movably engaging said third rotary member slot to rotate said third rotary member about said first axis as said second rotary member rotates, the engagement of said coupling member with said slot being such that there is a relative lost motion between said coupling member and said third rotating member during cyclical periods of movement of said coupling member whereby said third member accelerates from or near zero velocity and decelerates to or near zero velocity as said first rotary member rotates at a constant velocity;

said rotation inducing means being a stationary gear carried by said support frame, said second rotary member having a gear formed thereon and engaging said stationary gear such that said second rotary member rotates about said second movable axis as said first rotary member moves said second rotary member relative to said stationary gear; and said first rotary member having an aperture within which said second rotary member is rotatably mounted with the gear of said second rotary member engaging said stationary gear, the outer surface of said first rotary member being provided with a ring gear engageable by said first driving means for rotating said first rotary member about said first fixed axis, said stationary gear being concentric with said first fixed axis.

5. A combined epicycloidal and harmonic motion generating mechanism comprising:

a support frame;

a first rotary member carried by said support frame for rotation about a fixed first axis;

first driving means for driving said first rotary member at a constant velocity;

a second rotary member carried by said first rotary member and rotatable therewith about said first axis as said second rotating member rotates about a second movable axis that is parallel to said first axis;

rotation inducing means carried by said support frame and engaging said second rotary member for rotating said second rotary member about said second axis;

a third rotary member carried by said support frame for rotation about said first axis, said third rotary member being axially spaced from said first and second rotary members, said third rotary member having one side thereof adjacent said second rotary member, said one side having a radial slot;

a coupling member carried by said second rotary member and spaced from said second axis, said coupling member moving along a uniform circular path as said second rotary member rotates about said second axis, said coupling member movably engaging said third rotary member slot to rotate said third rotary member about said first axis as said second rotary member rotates;

said rotation inducing means being a stationary gear carried by said support frame, said second rotary member having a gear formed thereon and engaging said stationary gear such that said second rotary member rotates about said second movable axis as said first rotary member moves said second rotary member relative to said stationary gear, the engagement of said coupling member with said slot being such that there is a relative lost motion between said coupling member and said third rotating member during cyclical periods of movement of said coupling memeber whereby said third member accelerates from or near zero velocity and decelerates to or near zero velocity as said first rotary member rotates at a constant velocity; and a coupling member carried by said third rotary member and a crank arm extending therefrom for motion through a non-linear path.

6. The combined epicycloidal and harmonic motion generating mechanism defined in claim 5 wherein the ratio of the pitch diameter of said stationary gear to the pitch diameter of said gear of said second rotary member is 2:1.

7. A combined epicycloidal and harmonic motion generating mechanism comprising:

a support frame;

a first rotary member carried by said support frame for rotation about a fixed first axis;

first driving means for driving said first rotary member at a constant velocity;

a second rotary member carried by said first rotary member and rotatable therewith about said first axis as said second rotating member rotates about a second movable axis that is parallel to said first axis;

rotation inducing means carried by said support frame and engaging said second rotary member for rotating said second rotary member about said second axis;

a third rotary member carried by said support frame for rotation about said first axis, said third rotary member being axially spaced from said first and second rotary members, said third rotary member having one side thereof adjacent said second rotary member, said one side having a radial slot;

a coupling member carried by said second rotary member and spaced from said second axis, said coupling member moving along a uniform circular path as said second rotary member rotates about said second axis, said coupling member movably engaging said third rotary member slot to rotate said third rotary member about said first axis as said second rotary member rotates, the engagement of said coupling member with said slot being such that there is a relative lost motion between said coupling member and said third rotating member during cyclical periods of movement of said coupling member whereby said third member accelerates from or near zero velocity and decelerates to or near zero velocity as said first rotary member rotates at a constant velocity;

said rotation inducing means being a stationary gear carried by said support frame, said second rotary member having a gear formed thereon and engaging said stationary gear such that said second rotary member rotates about said second movable axis as said first rotary member moves said second rotary member relative to said stationary gear; and said third rotary member carrying an output member having a point which moves along a prescribed linear path and wherein the incremental displacement "S" of said motion along said prescribed linear path is defined by the formula:

$$S = R3 - R3 (\cos B);$$

wherein the angle $B = A - C$;

wherein $\text{Tan } C = R2 (\sin 2A) / R1 - [R2 (\cos 2A)]$;

wherein R1 represents the distance from the center of the secondary rotary member to the first fixed axis;

R2 represents one half the pitch diameter of the second rotary member gear;

R3 is one half of the total distance in which the output member may move over the prescribed linear path;

A represents the angular rotational travel of the first rotary member;

2A represents the angular rotational movement of the secondary rotary member; and B represents the angular rotational movement of the output member.

8. A combined epicycloidal and harmonic motion generating mechanism comprising:

a support frame;

a first rotary member carried by said support frame for rotation about a fixed first axis;

first driving means for driving said first rotary member at a constant velocity;

a second rotary member carried by said first rotary member and rotatable therewith about said first axis as said second rotating member rotates about a second movable axis that is parallel to said first axis;

rotation inducing means carried by said support frame and engaging said second rotary member for rotating said second rotary member about said second axis;

a third rotary member carried by said support frame for rotation about said first axis, said third rotary member being axially spaced from said first and second rotary members, said third rotary member having one side thereof adjacent said second rotary member, said one side having a radial slot; and a coupling member carried by said second rotary member and disposed along an axis which is spaced from said second axis, said coupling member moving along a uniform circular path as said second rotary member rotates about said second axis, said coupling member movably engaging said third rotary member slot to rotate said third rotary member about said first axis as said second rotary member rotates, the engagement of said coupling member with said slot being such that there is a relative lost motion between said coupling member and said third rotating member during cyclical periods of movement of said coupling member whereby said third member accelerates from or near zero velocity and decelerates to or near zero velocity as said first rotary member rotates at a constant velocity.

9. The combined epicycloidal and harmonic motion generating mechanism defined in claim 8 further comprising:

gear means carried by said third rotary member; and a crank arm engageable with said gear means, said crank arm being so carried by said mechanism that a point on said crank arm follows a prescribed linear path as said first rotary member is rotated.

10. The combined epicycloidal and harmonic motion generating mechanism defined in claim 8 further comprising:

a stationary ring gear carried by said mechanisn at a point above said third rotary member; and a planetary gear carried by said third rotary member for rotation about a defined axis spaced from and parallel to said first axis, said planetary gear engaging said ring gear as said planetary gear rotates with said third rotary member, said planetary member having a point thereon which will move through a prescribed linear path as said first rotary member is rotated.

* * * * *

UNITED STATES PATENT AND TRADEMARK OFFICE
CERTIFICATE OF CORRECTION

PATENT NO. : 4,089,228
DATED : May 16, 1978
INVENTOR(S) : Bart R. Obra

It is certified that error appears in the above-identified patent and that said Letters Patent are hereby corrected as shown below:

Column 10, line 35, following "indexing" delete "trunniontype" and insert --trunnion-type--;

Column 11, line 39, following "constant" delete "valocity" and insert --velocity--;

Column 11, line 49, following "maximum" delete "valocity" and insert --velocity--;

Column 12, line 50, delete "valocity" and insert --velocity--;

Column 15, line 3, following "coupling" delete "memeber" and insert --member--.

Signed and Sealed this

Nineteenth Day of December 1978

[SEAL]

Attest:

RUTH C. MASON
Attesting Officer

DONALD W. BANNER
Commissioner of Patents and Trademarks